United States Patent
Lin

(10) Patent No.: US 9,946,038 B1
(45) Date of Patent: Apr. 17, 2018

(54) CABLE TRACING TYPE JUMPER CABLE

(71) Applicant: Jyh Eng Technology Co., Ltd., New Taipei (TW)

(72) Inventor: Yen-Lin Lin, New Taipei (TW)

(73) Assignee: JYH ENG TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 15/701,914

(22) Filed: Sep. 12, 2017

(51) Int. Cl.
*G02B 6/38* (2006.01)
*G02B 6/44* (2006.01)
*H01R 13/641* (2006.01)

(52) U.S. Cl.
CPC ......... *G02B 6/3895* (2013.01); *G02B 6/3817* (2013.01); *G02B 6/4416* (2013.01); *G02B 6/4467* (2013.01); *H01R 13/641* (2013.01)

(58) Field of Classification Search
CPC ..... G02B 6/3895; G02B 6/4416; G02B 6/447
See application file for complete search history.

(56) References Cited

U.S. PATENT DOCUMENTS

| 5,666,453 A | 9/1997 | Witte |
| 7,524,082 B2 | 4/2009 | North |
| 2015/0205056 A1* | 7/2015 | Lin ..................... G02B 6/3879 385/76 |

* cited by examiner

*Primary Examiner* — Sung Pak
*Assistant Examiner* — Hoang Tran
(74) *Attorney, Agent, or Firm* — Guice Patents PLLC

(57) ABSTRACT

A cable tracing type jumper cable include a first electrical connector including an insulative holder shell, a pin block and a connection block at two opposite ends of the insulative holder shell and a first circuit board with a light-emitting device mounted in the connection block, a lead wire set connected with one end thereof to the first electrical connector and including multiple optical fibers, and second electrical connectors connected to an opposite end of the lead wire set each including a lower insulative holder shell, a second circuit board with a light-emitting device mounted in the lower insulative holder shell and electrical plugs mounted in one end of the lower insulative holder shell opposite to the lead wire set. When a voltage is applied to the lead wire set, the light-emitting devices in the first and second electrical connectors are electrically conducted to emit light for tracing.

12 Claims, 8 Drawing Sheets

US 9,946,038 B1

CABLE TRACING TYPE JUMPER CABLE

BACKGROUND OF THE INVENTION

1. Field of the Invention

The present invention relates to jumper cable technology and more particularly, to cable tracing type jumper cable with light-emitting function for cable tracing.

2. Description of the Related Art

In the field of Internet communication technology, network jumper cables are widely used for signal connection between personal computers and the wall network information outlets. Network jumpers are also used for the construction of network rooms and building of network wirings in each room of a building.

For connection between a personal computer and wall network information outlets, a network jumper cable is normally installed using an exposed wiring technique. The number of wall network information outlets for the connection of a network jumper cable does not exceed by 6. If a network signal transmission problem occurs, such as network line break, cable tracing can easily be performed.

However, for the construction of network rooms or building network wirings in each room of a building, a large number of network jumper cables will be used. The installed network jumper cable may extend over one another, or arranged in bumpers. Thus, it will be difficult to tract the network cables of the network jumper cables.

In order to eliminate the aforesaid problem, U.S. Pat. No. 5,666,453 discloses a specialized fiber optic jumper cable that includes a composite cable with a glass fiber light guide, standard fiber optic connectors, electrically powered LEDs at the fiber optic connectors, and a pair of electrical conductors embedded in the cable, with one or more electrical power connectors for selectively applying an external electrical power source to the light emitting devices. The LEDs are lighted whenever power is applied to either of the electrical connectors. The attendant illumination of the LEDs provides an indication that the tracer system is activated and functioning properly and readily indicates where both ends of the same jumper cable are located.

U.S. Pat. No. 7,524,082 discloses a cable that includes a waveguide with a lighting system removeably attached to it. The lighting system includes a plurality of light emitters extending along the waveguide and connected together with conductive lines. The lighting system also includes light emitter connectors which can be engaged with a power source to activate the light emitters. The activation of the light emitters is useful in cable tracing because it indicates where the waveguide extends.

With the progress of Internet technology, the type of network jumper cables has changed from the original single-core fiber optic cable into a dual-core, or even multi-core jumper cables (trunk cable). Under this situation, the tracing method for tracing one connector to one respective mating connector becomes not workable, or a warning light-emitting means can simply be installed in branch areas of the cable for giving off visual warning. However, installing light-emitting means in branch areas can cause a problem, i.e., when jumper cables are arranged in a cable management chamber in a machine cabinet in a network room, cable tracing can still be performed, however, the multiple branch connectors must be individually checked during the cable tracing operation. If the electrical wires of the front end branch connectors are tangled with the electrical wires of the branch connectors of other network jumper cables, the connectors can be erroneously disconnected, leading to a big problem.

SUMMARY OF THE INVENTION

The present invention has been accomplished under the circumstances in view. It is the main object of the present invention to provide a cable tracing type jumper cable, which has light-emitting devices respectively installed in the electrical connectors thereof for emitting light when an external power supply is applied thereto, facilitating cable tracing for easy cable identification or replacement.

To achieve this and other objects of the present invention, a cable tracing type jumper cable comprises, a first electrical connector, a plurality of second electrical connectors, and a lead wire set electrically connected between the first electrical connector and the second electrical connectors. The first electrical connector comprises an insulative holder shell comprising a plurality of rails located at a top side thereof and two retaining holes respectively disposed at two opposite lateral sides thereof, a casing attached onto one end of the insulative holder shell and comprising a sliding groove coupled to the rails of the insulative holder shell, a pin block connected to a front end of the insulative holder shell and comprising a plurality of conducting pins located at a front end thereof, a connection block connected to an opposing rear end of the insulative holder shell and comprising a plurality of locating arms bilaterally disposed at one end thereof and inserted into the insulative holder shell and a hook portion located at each locating arm and hooked in one respective retaining hole of the insulative holder shell, a combination cover covering the connection block, and a first circuit board accommodated in the connection block and having a light-emitting device electrically connected to one side thereof. Each second electrical connector comprises a lower insulative holder shell that comprises a guide groove located at one end thereof for accommodating the optical fibers, an accommodation chamber, two hook holes respectively disposed in communication with two opposite sides of the accommodation chamber, a plurality of stop plates bilaterally disposed in a middle part thereof, a groove located at a bottom side of each stop plate, two side notches respectively disposed at two opposite lateral sides thereof and a plurality of plug mounting holes located at an opposite end thereof, a second circuit board mounted in the accommodation chamber and having a light-emitting device electrically connected to one side thereof, a first top cover fastened to the lower insulative holder shell to cover the accommodation chamber and comprising a smoothly arched cap mating with the guide groove, a plurality of hook portions bilaterally located at a bottom side of the first top cover and respectively hooked in the hook holes of the lower insulative holder shell, a plurality of hook rods respectively downwardly extended from one side thereof opposite to the smoothly arched cap and respectively hooked in the respective grooves of thee lower insulative holder shell and two sliding rails respectively disposed at two opposite lateral sides relative to the hook rods, a second top cover fastened to the lower insulative holder shell and the first top cover and comprising a guard plate located at a top side thereof, a plurality of guide blocks internally located at one end thereof for hooking on the sliding rails of the first top cover, two clamping plate respectively downwardly extended from two opposite lateral sides thereof and respectively clamped on the side notches of the lower insulative holder shell, a plurality of openings located at an opposite end thereof and respectively disposed to mate with the plug mounting holes of the lower insulative holder shell and a plurality of electrical plugs mounted in the lower insulative holder shell. Each electrical plug comprises a positioning block located at one end thereof and positioned in one respective plug mounting hole, a conducting tube mounted therein and a clip located at a top side thereof. The lead wire set comprises a main tube and a plurality of branch tubes. Each branch tube has accommodated therein a pair of optical fibers and a pair of electrical wires. The main tube is connected with respective one ends of the branch tubes to accommodate the optical fibers and electrical wires of the branch tubes. The optical fibers and the electrical wire have respective one ends thereof respectively electrically connected to the pin block and said first circuit board, and respective opposite ends thereof respectively electrically connected to the conducting tubes of the electrical plugs of the second electrical connectors and the second circuit board. Thus, when a voltage is applied to the lead wire set, the light-emitting devices of the first electrical connector and the light-emitting devices of the second electrical connectors are electrically conducted to emit light.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
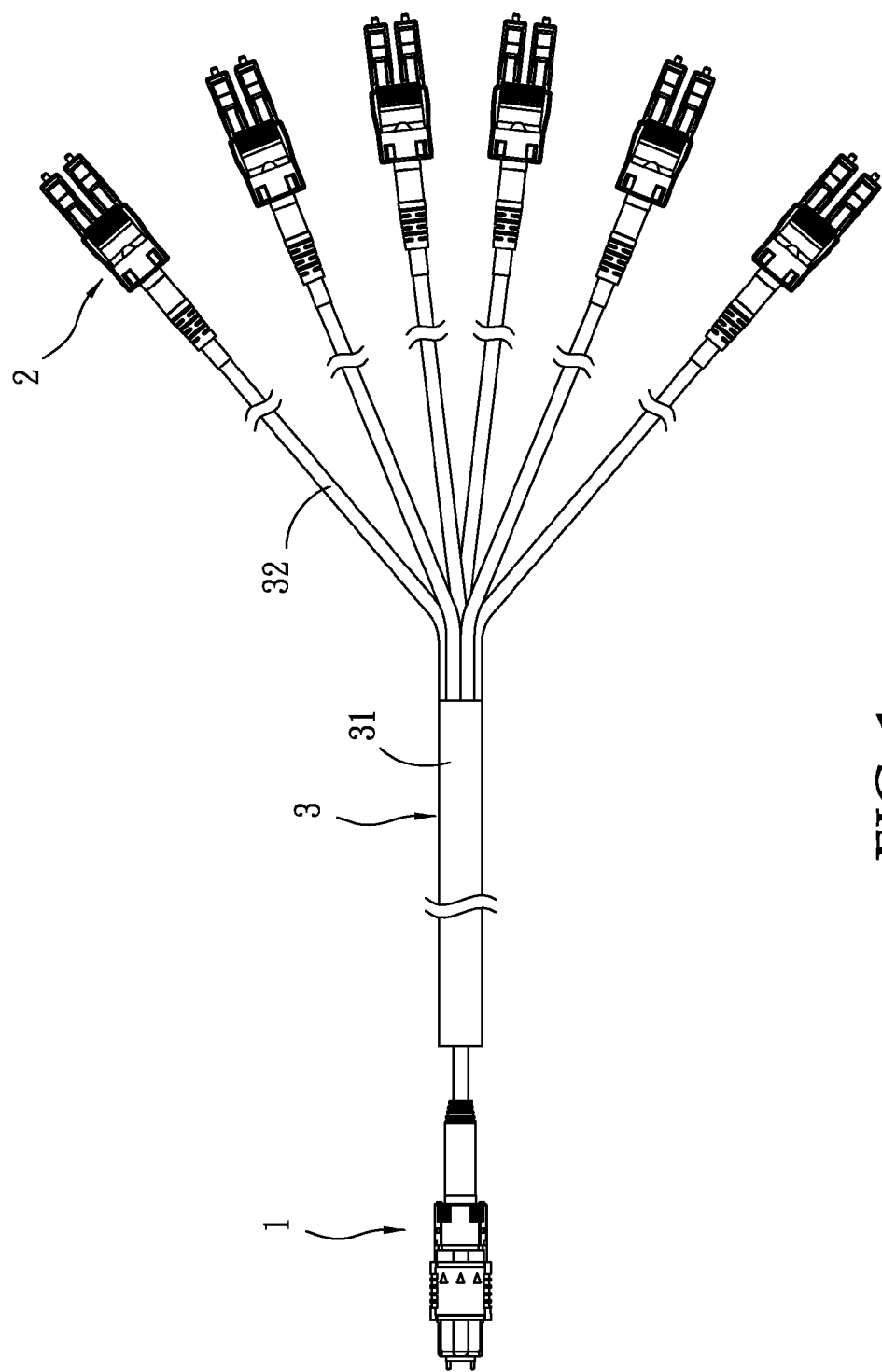
FIG. 1 is a schematic elevational view of a cable tracing type jumper cable in accordance with the present invention.
Figure 2:
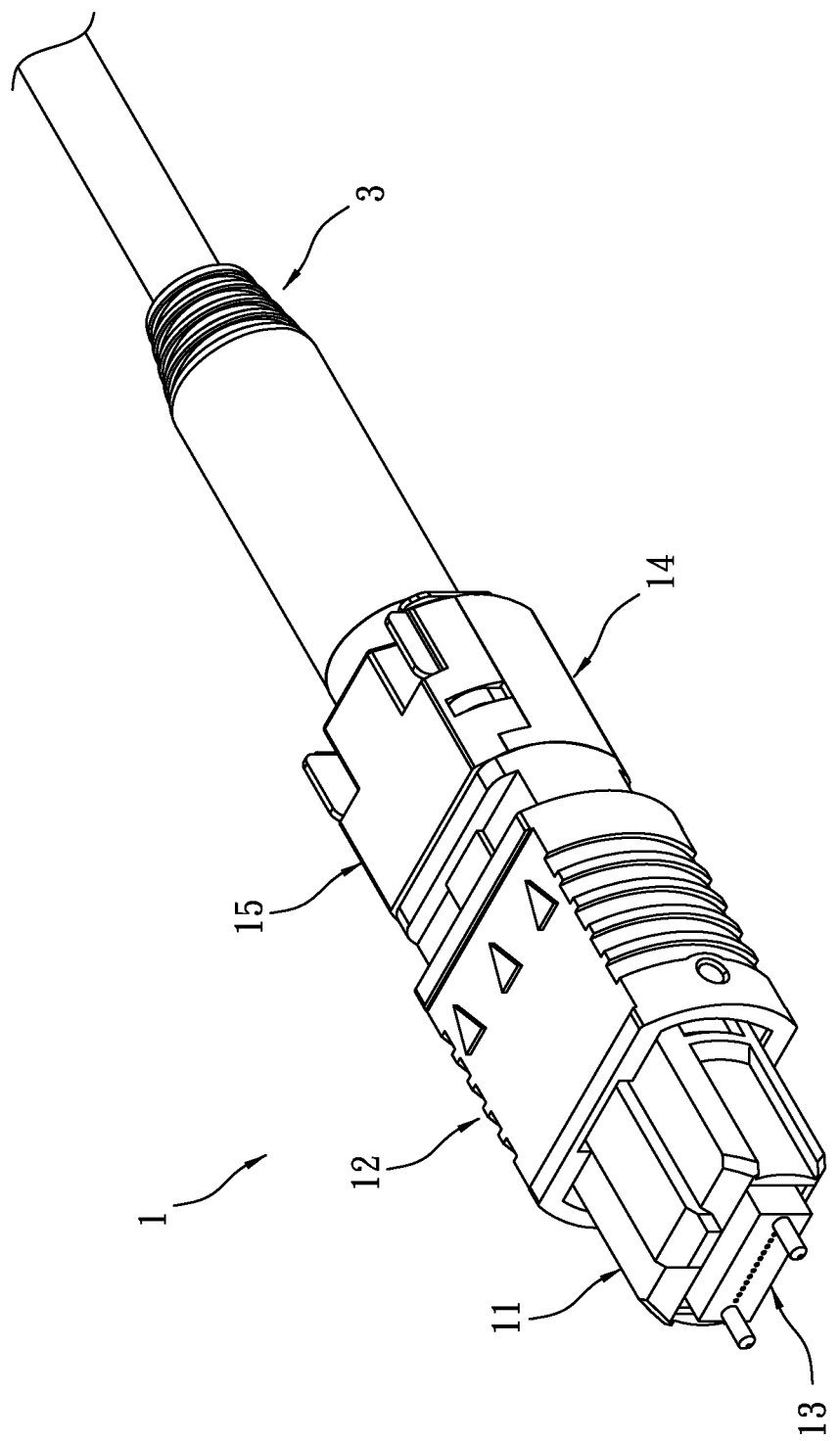
FIG. 2 is an enlarged view of a part of the present invention, illustrating the outer appearance of the first electrical connector.
Figure 3:
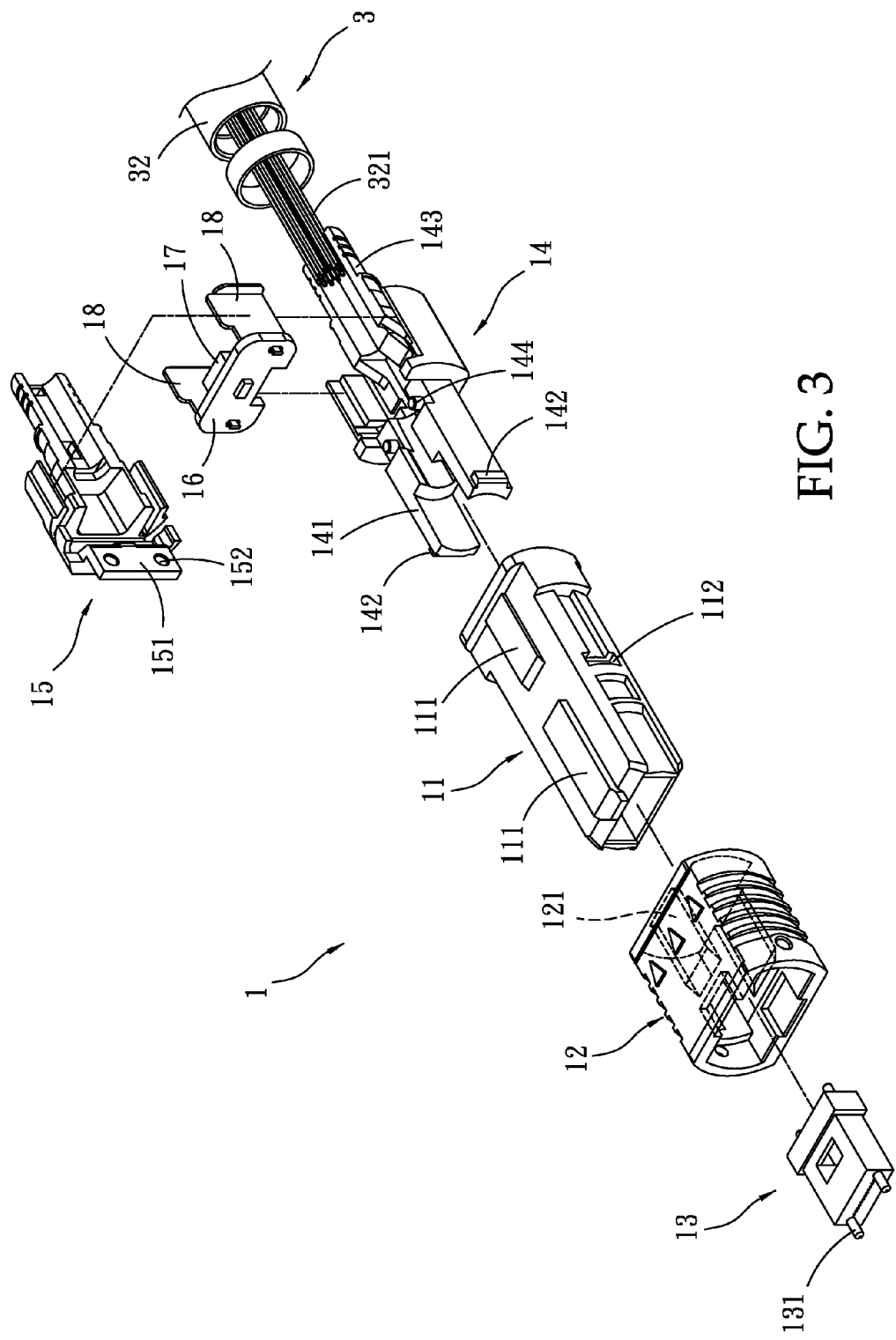
FIG. 3 is an exploded view of the first electrical connector of the cable tracing type jumper cable in accordance with the present invention.
Figure 6:
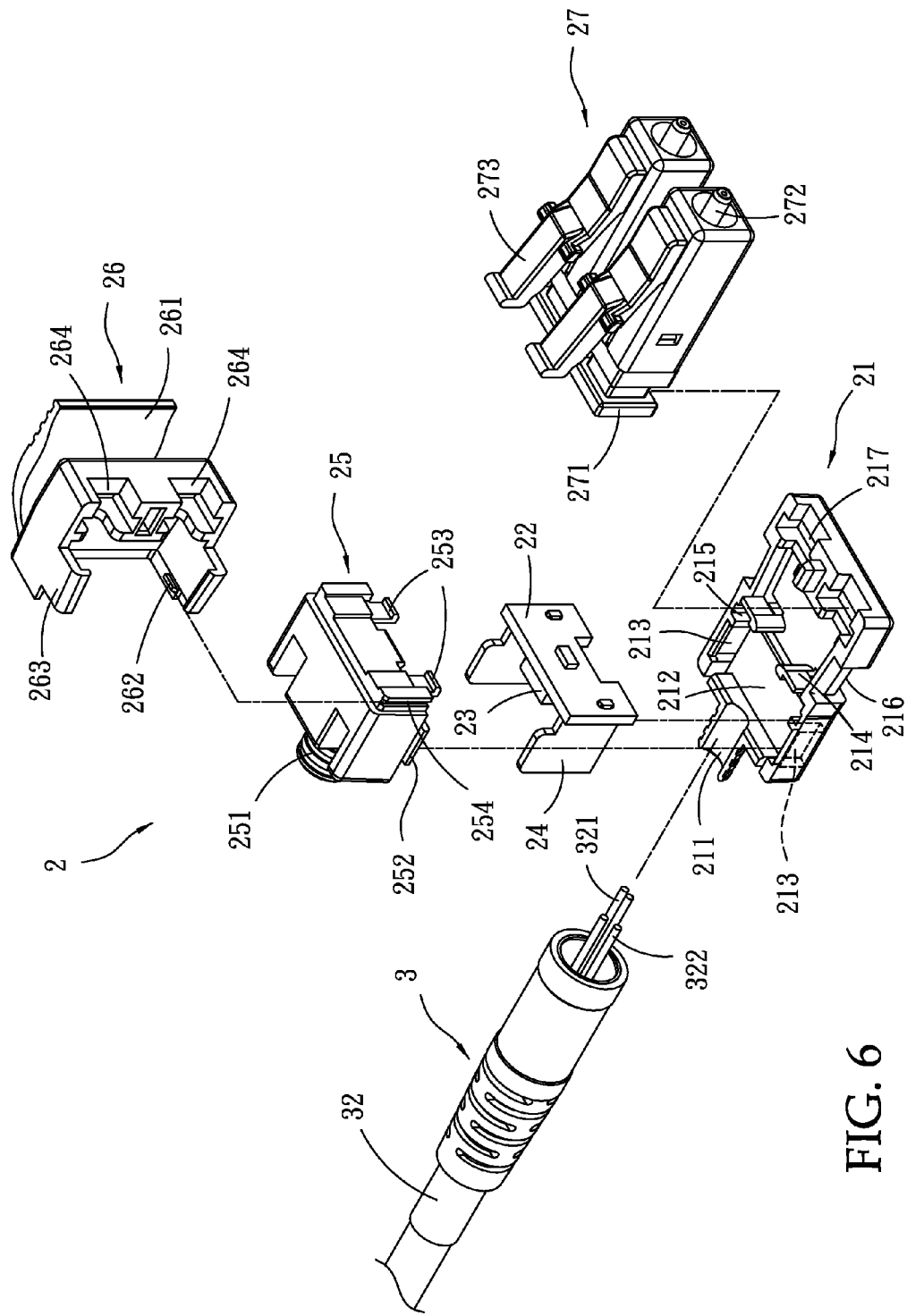
FIG. 6 is an exploded view of the second electrical connector of the cable tracing type jumper cable in accordance with the present invention.

Referring to FIGS. 1 and 2, a cable tracing type jumper cable in accordance with the present invention is shown. The cable tracing type jumper cable generally comprises a first electrical connector 1, a plurality of second electrical connectors 2, and a lead wire set 3 connected between the first electrical connector 1 and the second electrical connectors 2. The lead wire set 3 comprises a main tube 31 and a plurality of branch tubes 32. Each branch tube 32 has accommodated therein a plurality of optical fiber 321 and a plurality of electrical wires 322 (in this embodiment, one pair of electrical wires 322). The main tube 31 is connected with respective one ends of the branch tubes 32 to accommodate the optical fibers 321 and electrical wires 322 of the branch tubes 32, as illustrated in FIG. 6. The first electrical connector 1 is electrically connected to one end of the lead wire set 3, as illustrated in FIG. 2 and FIG. 3, comprising an insulative holder shell 11 that is an elongated hollow shell having a plurality of rails 111 located at a top side thereof and longitudinally aligned in a line and a retaining hole 112 located at each of two opposite lateral sides thereof, a casing 12 attached onto the insulative holder shell 11 and having a sliding groove 121 disposed in an inner top side thereof and slidably coupled to the rails 111 of the insulative holder shell 11. In installation, the casing 12 is attached onto one end of the insulative holder shell 11, and then pushed into abutment against an opposite end of the insulative holder shell 11.

Figure 4:
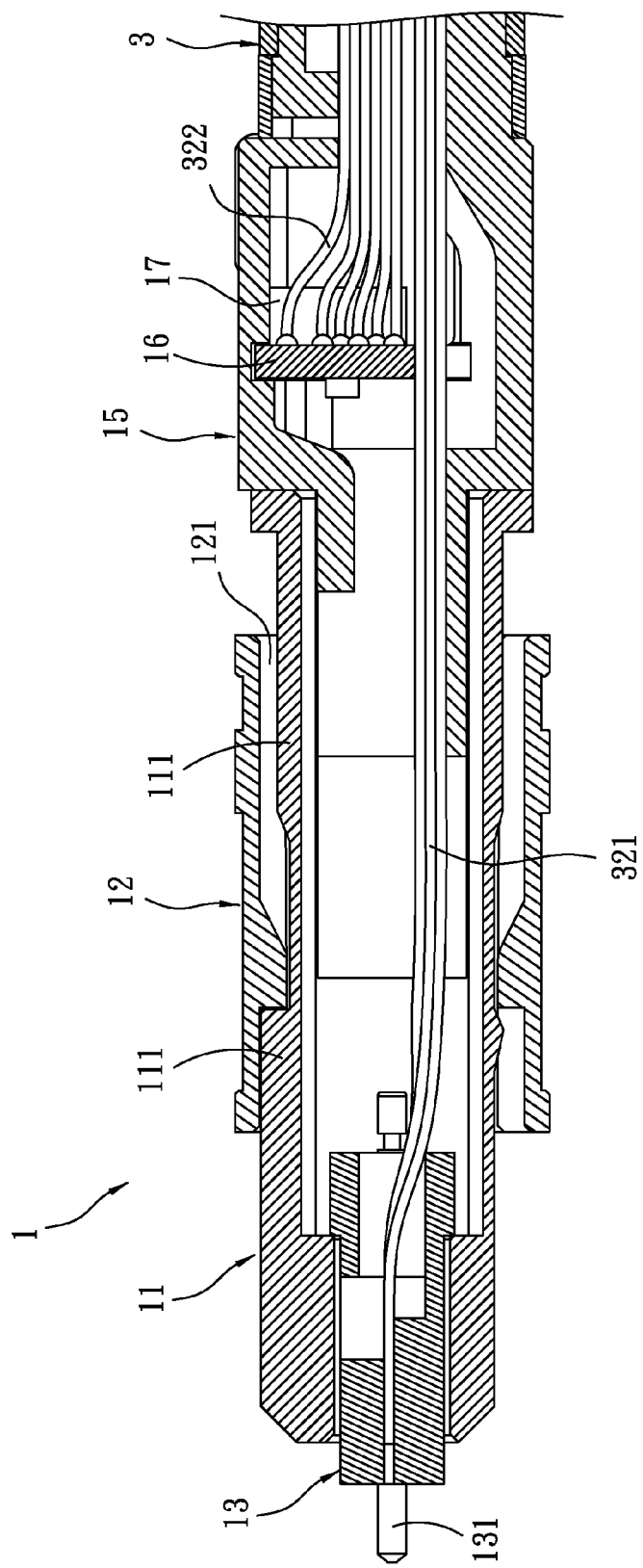
FIG. 4 is a longitudinal sectional view of the first electrical connector of the cable tracing type jumper cable in accordance with the present invention.

Referring to FIGS. 2 and 3 again, the first electrical connector 1 further comprises a pin block 13 that is mounted in a front end of the insulative holder shell 11 and has a plurality of conducting pins 131 extended out of a front side thereof, a connection block 14 that is connected to an opposite rear end of the insulative holder shell 11 and that comprises a pair of locating arms 141 bilaterally disposed at one end thereof and inserted into the inside of the insulative holder shell 11, a hook portion 142 located at a front end of each of the locating arm 141 and respectively hooked in one respective retaining hole 112 of the insulative holder shell 11 to firmly secure the insulative holder shell 11 and the connection block 14 together, a guide tube 143 located at an opposite end thereof for holding the optical fibers 321 and electrical wires 322 of the lead wire set 3 for allowing the optical fibers 321 to extend to the inside of the first electrical connector 1 and a plurality of locating rod 144 located at a top side thereof, a combination cover 15 that is capped on the connection block 14 and that comprises a positioning plate 151 and a plurality of positioning holes 152 located on the positioning plate 151 respectively fastened to the locating rod 144 of the connection block 14 to secure the combination cover 15 and the connection block 14 together, a first circuit board 16 mounted in the connection block 14, a light-emitting device 17 electrically connected to the first circuit board 16, and two mounting plate 18 bilaterally connected between the first circuit board 16 and the connection block 14 to secure the first circuit board 16 and the connection block 14 firmly together. In this embodiment, the light-emitting device 17 is a light-emitting diode. As illustrated in FIG. 4. The electrical wires 322 are electrically connected to the first circuit board 16; the optical fibers 321 are extended to the pin block 13 and electrically connected to the conducting pins 131 for signal transmission.

Figure 5:
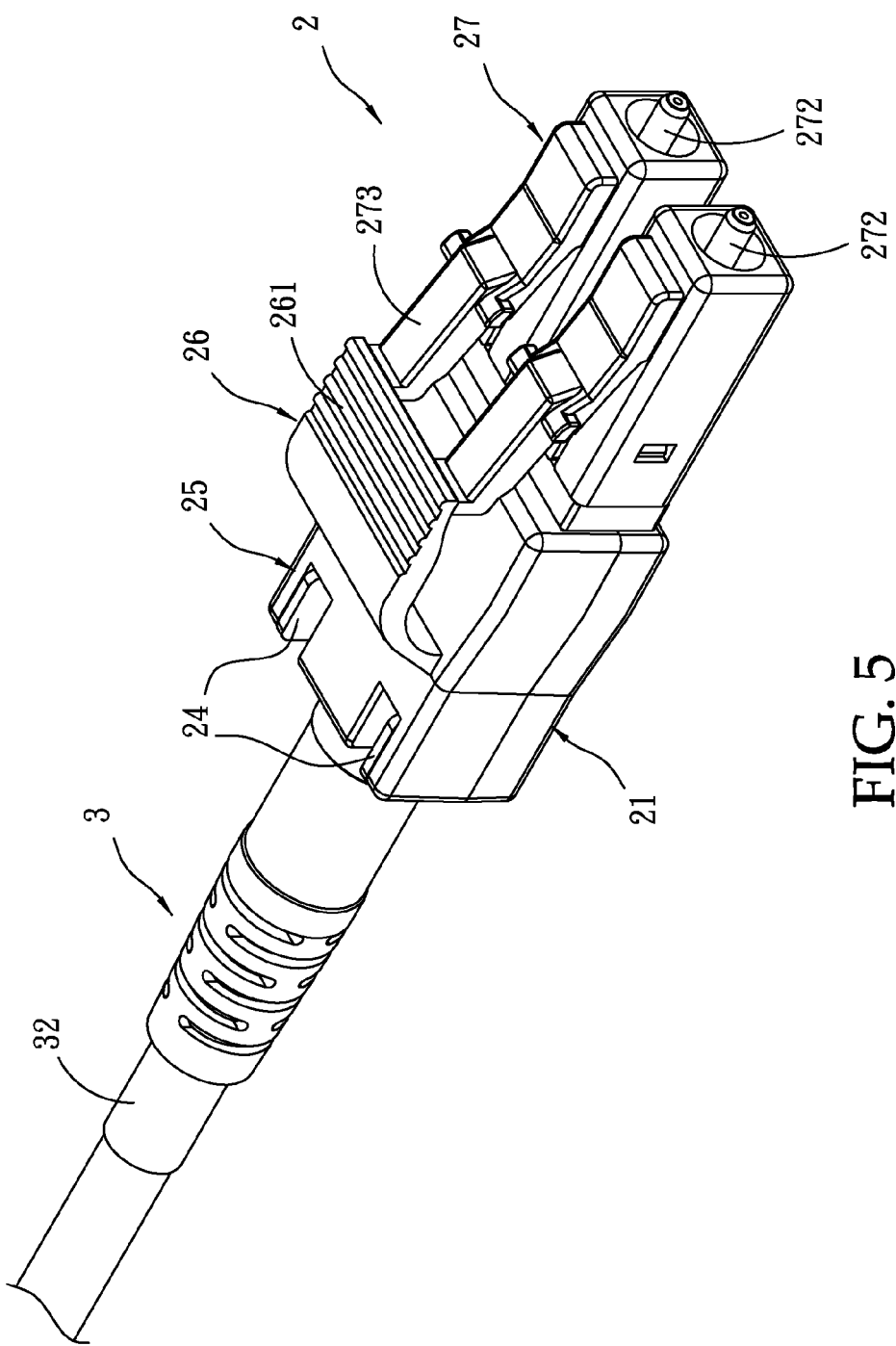
FIG. 5 is an enlarged view of a part of the present invention, illustrating the outer appearance of the second electrical connector.

Referring to FIGS. 5 and 6, each second electrical connector 2 is electrically connected to the first electrical connector 1 through the lead wire set 3, comprising a lower insulative holder shell 21 that is an elongated shell and that comprises a guide groove 211 of arched cross section located at one end thereof for guiding the optical fibers 321 and electrical wires 322 of the lead wire set 3, an accommodation chamber 212, two hook hole s 213 respectively disposed in communication with two opposite lateral sides of the accommodation chamber 212, a second circuit board 22 mounted in the accommodation chamber 212 and electrically connected with the electrical wires 322, a light-emitting device 23 electrically connected to the second circuit board 22, two mounting plates 24 bilaterally connected between the second circuit board 22 and the lower insulative holder shell 21 to secure the second circuit board 22 firmly in the accommodation chamber 212, a plurality of stop plate 214 disposed inside the lower insulative holder shell 21 on the middle, a groove 215 disposed at a bottom side of each stop plate 214, two opposing side notches 216 respectively located at two opposite lateral sides of the lower insulative holder shell 21, and a plurality of plug mounting holes 217 located at an opposite end of the lower insulative holder shell 21. In this embodiment, the light-emitting device 23 is a light-emitting diode.

Referring to FIGS. 5 and 6, each second electrical connector 2 further comprises a first top cover 25 and second top cover 26 respectively covered on the lower insulative holder shell 21. The first top cover 25 is adapted for covering the accommodation chamber 212 to protect the second circuit board 22, comprising a smoothly arched cap 251 mating with the guide groove 211 to protect the optical fibers 321, two hook portions 252 bilaterally located at a bottom side of the first top cover 25 and respectively hooked in the hook holes 213 of the lower insulative holder shell 21, a plurality of hook rods 253 respectively downwardly extended from one side of the first top cover 25 opposite to the smoothly arched cap 251 and respectively hooked in the respective grooves 215 of the lower insulative holder shell 21, and two sliding rails 254 respectively disposed at two opposite lateral sides relative to the hook rods 253. The second top cover 26 is fastened to the lower insulative holder shell 21 and the first top cover 25, comprising a guard plate 261 that can be pressed by the user, a plurality of guide blocks 262 internally located at one end thereof for hooking on the sliding rails 254 of the first top cover 25 to secure the first top cover 25 and the second top cover 26 together, two clamping plate 263 respectively downwardly extended from two opposite lateral sides thereof and respectively clamped on the side notches 216 of the lower insulative holder shell 21 to secure the second top cover 26 and the lower insulative holder shell 21 positively together, and a plurality of openings 264 located at an opposite end thereof and respectively disposed to mate with the plug mounting holes 217 of the lower insulative holder shell 21. Further, the first top cover 25 is made of a transparent material for letting the emitted light of the light-emitting device 23 to go through the first top cover 25 to the outside. Alternatively, the first top cover 25 can be colored in any of a variety of colors that admits light.

Figure 7:
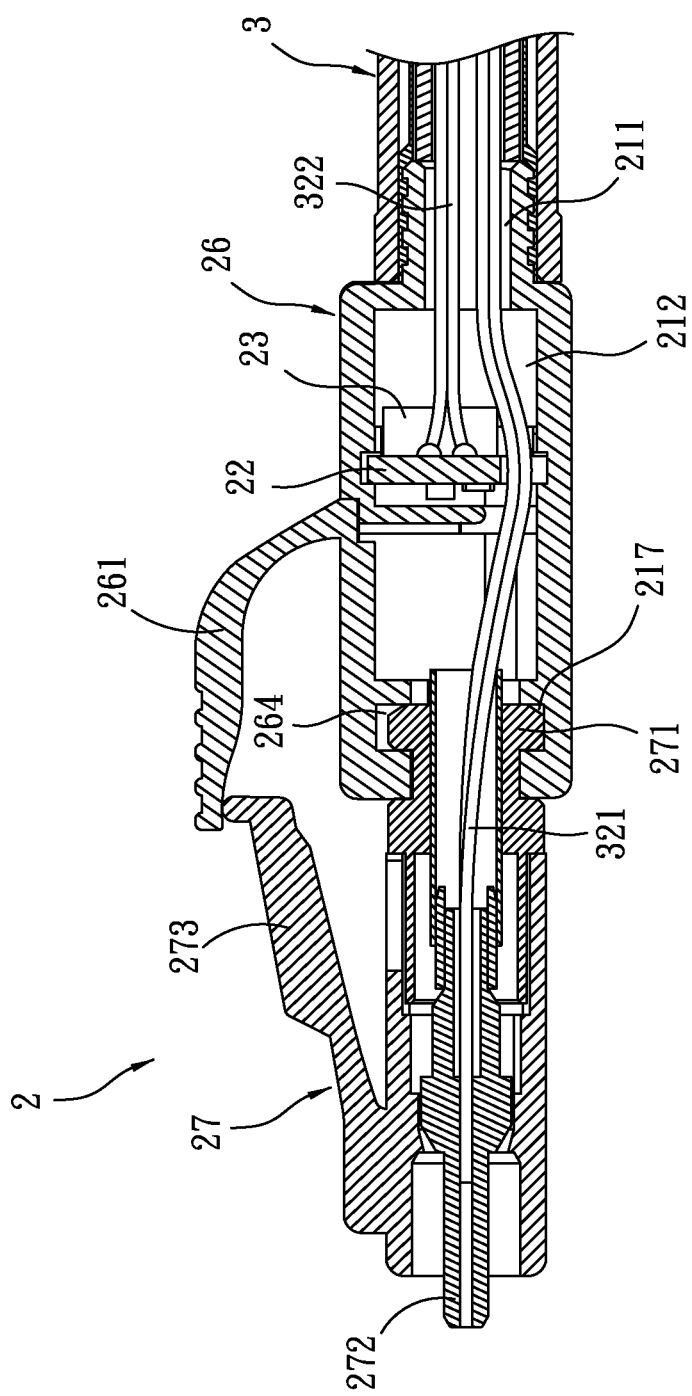
FIG. 7 is a longitudinal sectional view of the second electrical connector of the cable tracing type jumper cable in accordance with the present invention.

Referring to FIGS. 5 and 6 again, each second electrical connector 2 further comprises a plurality of electrical plugs 27 respectively mounted in the plug mounting hole 217 of the lower insulative holder shell 21. The electrical plugs 27 have an elongated shape, each comprising a positioning block 271 located at one end thereof and positioned in the lower insulative holder shell 21, a conducting tube 272 axially disposed at the center, and a clip 273 located at a top side thereof. As illustrated in FIG. 7, the optical fibers 321 of the lead wire set 3 are respectively electrically connected to the conducting tubes 272 of the electrical plugs 27 to electrically conduct the first electrical connector 1 and the second electrical connectors 2. After the first electrical connector 1 and the second electrical connectors 2 are respectively connected to respective external pin blocks (not shown), a voltage is applied to the lead wire set 3 of the cable tracing type jumper cable, causing the light-emitting device 17 of the first electrical connector 1 and the light-emitting devices 23 of the second electrical connectors 2 to emit light for tracing.

Figure 8:
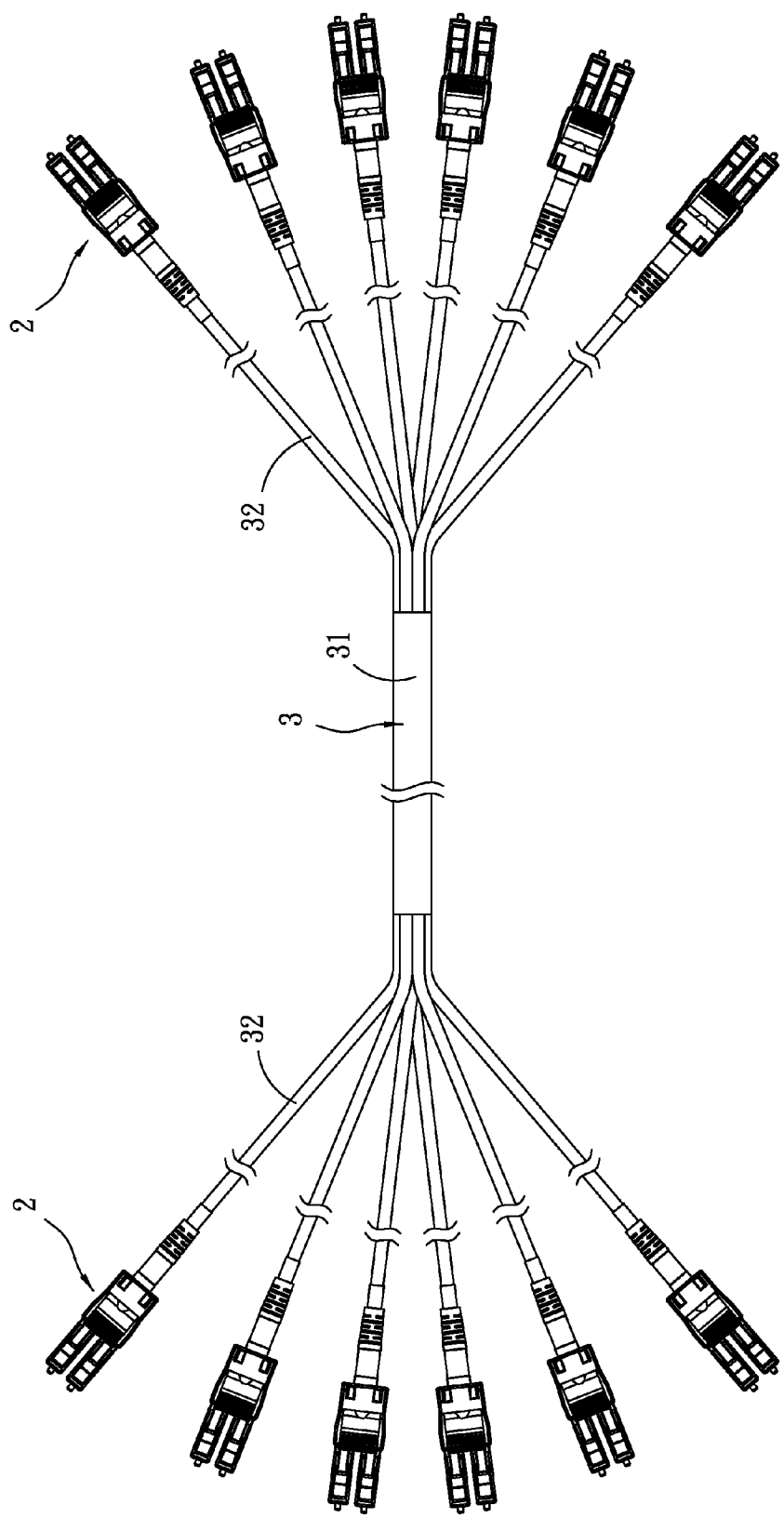
FIG. 8 is a schematic elevational view of an alternate form of the cable tracing type jumper cable in accordance with the present invention.

FIG. 8 illustrates an alternate form of cable tracing type jumper cable in accordance with the present invention. According to this alternate form, multiple second electrical connectors 2 are respectively connected at two opposite ends of the lead wire set 3. When a voltage is applied to the cable tracing type jumper cable, the second electrical connectors 2 at the two opposite ends of the lead wire set 3 are electrically conducted to emit light for tracing.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A cable tracing type jumper cable, comprising:
   a first electrical connector comprising:
      an insulative holder shell comprising a plurality of rails located at a top side thereof and two retaining holes respectively disposed at two opposite lateral sides thereof;
      a casing attached onto one end of said insulative holder shell, said casing comprising a sliding groove coupled to said rails of said insulative holder shell;
      a pin block connected to a front end of said insulative holder shell, said pin block comprising a plurality of conducting pins located at a front end thereof;
      a connection block connected to an opposing rear end of said insulative holder shell, said connection block comprising a plurality of locating arms bilaterally disposed at one end thereof and inserted into said insulative holder shell and a hook portion located at each said locating arm and hooked in one respective said retaining hole of said insulative holder shell;
      a combination cover covering said connection block; and
      a first circuit board accommodated in said connection block and having a light-emitting device electrically connected to one side thereof;
   a plurality of second electrical connectors, each said second electrical connector comprising:
      a lower insulative holder shell comprising a guide groove located at one end thereof for accommodating said optical fibers, an accommodation chamber, two hook holes respectively disposed in communication with two opposite sides of said accommodation chamber, a plurality of stop plates bilaterally disposed in a middle part thereof, a groove located at a bottom side of each said stop plate, two side notches respectively disposed at two opposite lateral sides thereof, and a plurality of plug mounting holes located at an opposite end thereof;
      a second circuit board mounted in said accommodation chamber and having a light-emitting device electrically connected to one side thereof;
      a first top cover fastened to said lower insulative holder shell to cover said accommodation chamber, said first top cover comprising a smoothly arched cap mating with said guide groove, a plurality of hook portions bilaterally located at a bottom side of said first top cover and respectively hooked in said hook holes of said lower insulative holder shell, a plurality of hook rods respectively downwardly extended from one side thereof opposite to said smoothly arched cap and respectively hooked in the respective said grooves of said lower insulative holder shell, and two sliding rails respectively disposed at two opposite lateral sides relative to said hook rods;
      a second top cover fastened to said lower insulative holder shell and said first top cove, said second top cover comprising a guard plate located at a top side thereof, a plurality of guide blocks internally located at one end thereof for hooking on said sliding rails of said first top cover, two clamping plate respectively downwardly extended from two opposite lateral sides thereof and respectively clamped on said side notches of said lower insulative holder shell, and a plurality of openings located at an opposite end thereof and respectively disposed to mate with said plug mounting holes of said lower insulative holder shell; and a plurality of electrical plugs mounted in said lower insulative holder shell, each said electrical plug comprising a positioning block located at one end thereof and positioned in one respective said plug mounting hole, a conducting tube mounted therein and a clip located at a top side thereof; and a lead wire set electrically connected between said first electrical connector and said second electrical connectors, said lead wire set comprising a main tube and a plurality of branch tubes, each said branch tube having accommodated therein a pair of optical fibers and a pair of electrical wires, said main tube being connected with respective one ends of said branch tubes to accommodate said optical fibers and said electrical wires of said branch tubes, said optical fibers and said electrical wire having respective one ends thereof respectively electrically connected to said pin block and said first circuit board and respective opposite ends thereof respectively electrically connected to said conducting tubes of said electrical plugs of said second electrical connectors and said second circuit board;

wherein when a voltage is applied to said lead wire set, the said light-emitting devices of said first electrical connector and said second electrical connectors are electrically conducted to emit light.

2. The cable tracing type jumper cable as claimed in claim 1, wherein said connection block further comprises a guide tube located at an opposite end thereof for accommodating said optical fibers.

3. The cable tracing type jumper cable as claimed in claim 1, wherein said connection block further comprises a plurality of locating rods disposed at a top side thereof; said combination cover further comprising a positioning plate, and a plurality of positioning holes located on said positioning plate and respectively fastened to said locating rods of said connection block.

4. The cable tracing type jumper cable as claimed in claim 1, wherein said first electrical connector further comprising a plurality of mounting plates bilaterally connected between said first circuit board and said connection block to secure said first circuit board and said connection block together.

5. The cable tracing type jumper cable as claimed in claim 1, wherein said guide groove is smoothly arched.

6. The cable tracing type jumper cable as claimed in claim 1, wherein each said second electrical connector further comprises a plurality of mounting plate bilaterally connected between the respective said second circuit board and said lower insulative holder shell to secure said second circuit board in said accommodation chamber.

7. The cable tracing type jumper cable as claimed in claim 1, wherein said first top covers of said second electrical connectors are made of a transparent material.

8. The cable tracing type jumper cable as claimed in claim 7, wherein said first top covers of said second electrical connectors are colored in different colors for tracing.

9. A cable tracing type jumper cable, comprising:

a lead wire set comprising a main tube and a plurality of branch tubes, each said branch tube having accommodated therein a pair of optical fibers and a pair of electrical wires, said main tube being connected with respective one ends of said branch tubes to accommodate said optical fibers and said electrical wires of said branch tubes; and a plurality of second electrical connectors respectively electrically connected to two opposite ends of said lead wire set, each said second electrical connector comprising:

a lower insulative holder shell comprising a guide groove located at one end thereof for accommodating said optical fibers, an accommodation chamber, two hook holes respectively disposed in communication with two opposite sides of said accommodation chamber, a plurality of stop plates bilaterally disposed in a middle part thereof, a groove located at a bottom side of each said stop plate, two side notches respectively disposed at two opposite lateral sides thereof, and a plurality of plug mounting holes located at an opposite end thereof;

a second circuit board accommodated in said accommodation chamber, said second circuit board having a light-emitting device electrically connected to one side thereof;

a first top cover fastened to said lower insulative holder shell to cover said accommodation chamber, said first top cover comprising a smoothly arched cap mating with said guide groove, a plurality of hook portions bilaterally located at a bottom side of said first top cover and respectively hooked in said hook holes of said lower insulative holder shell, a plurality of hook rods respectively downwardly extended from one side thereof opposite to said smoothly arched cap and respectively hooked in the respective said grooves of said lower insulative holder shell, and two sliding rails respectively disposed at two opposite lateral sides relative to said hook rods; first top cover;

a second top cover fastened to said lower insulative holder shell and said first top cove, said second top cover comprising a guard plate located at a top side thereof, a plurality of guide blocks internally located at one end thereof for hooking on said sliding rails of said first top cover, two clamping plate respectively downwardly extended from two opposite lateral sides thereof and respectively clamped on said side notches of said lower insulative holder shell, and a plurality of openings located at an opposite end thereof and respectively disposed to mate with said plug mounting holes of said lower insulative holder shell; and a plurality of electrical plugs mounted in said lower insulative holder shell, each said electrical plug comprising a positioning block located at one end thereof and positioned in one respective said plug mounting hole, a conducting tube mounted therein and a clip located at a top side thereof;

wherein when a voltage is applied to said lead wire set, the said light-emitting devices of said second electrical connectors are electrically conducted to emit light.

10. The cable tracing type jumper cable as claimed in claim 9, wherein each said second electrical connector further comprises a plurality of mounting plate bilaterally connected between the respective said second circuit board and said lower insulative holder shell to secure said second circuit board in said accommodation chamber.

11. The cable tracing type jumper cable as claimed in claim 9, wherein said first top covers of said second electrical connectors are made of a transparent material.

12. The cable tracing type jumper cable as claimed in claim 11, wherein said first top covers of said second electrical connectors are colored in different colors for tracing.

* * * * *